(12) United States Patent
Minasian et al.

(10) Patent No.: US 6,557,688 B2
(45) Date of Patent: May 6, 2003

(54) ELECTRO-MECHANICAL ACTUATOR AND CLUTCH FOR THE SAME

(75) Inventors: Henry Minasian, Weymouth, MA (US); Brian Ganter, Foxborough, MA (US); Bill Farmer, Haverhill, MA (US)

(73) Assignee: Stoneridge Control Devices, Inc., Canton, MI (US)

( * ) Notice: Subject to any disclaimer, the term of this patent is extended or adjusted under 35 U.S.C. 154(b) by 0 days.

(21) Appl. No.: 09/836,033

(22) Filed: Apr. 17, 2001

(65) Prior Publication Data

US 2002/0148702 A1 Oct. 17, 2002

(51) Int. Cl.$^7$ .......................... B60K 41/26; F16D 59/00
(52) U.S. Cl. ........................................ 192/223; 292/201
(58) Field of Search .......................... 192/223, 223.1, 192/219.2; 74/89.38, 89.39; 248/558; 292/201; 188/82.8

(56) References Cited

U.S. PATENT DOCUMENTS

| | | | |
|---|---|---|---|
| 657,244 A | 9/1900 | Liggett | |
| 1,858,065 A | * 5/1932 | Verderber | 192/223.2 |
| 1,858,066 A | * 5/1932 | Verderber | 192/223.2 |
| 2,209,122 A | * 7/1940 | Houplain | 192/223.2 |
| 2,812,044 A | 11/1957 | Cole, Jr. | |
| 3,585,817 A | 6/1971 | McCafferty, Jr. et al. | |
| 3,616,883 A | 11/1971 | Sindelar | |
| 3,802,222 A | 4/1974 | Weber | |
| 3,834,252 A | 9/1974 | Abell et al. | |
| 3,934,688 A | 1/1976 | Sides et al. | |
| 3,937,036 A | 2/1976 | Sauerwein | |
| 4,159,050 A | 6/1979 | Hopkins, Sr. et al. | |
| 4,161,242 A | 7/1979 | Moores, Jr. et al. | |
| 4,215,592 A | 8/1980 | Calvert | |
| 4,367,660 A | 1/1983 | Becker et al. | |
| 4,503,370 A | 3/1985 | Cuneo | |
| 4,608,820 A | 9/1986 | White et al. | |
| 4,643,040 A | 2/1987 | Adam et al. | |
| 4,710,071 A | 12/1987 | Koehler et al. | |
| 4,819,493 A | 4/1989 | Dornan | |
| 4,851,729 A | 7/1989 | Baines | |
| 4,903,535 A | * 2/1990 | Kikuta et al. | 74/89.38 |
| 4,908,988 A | 3/1990 | Yamamura et al. | |
| 5,024,022 A | 6/1991 | Ito | |
| 5,027,670 A | 7/1991 | Adam | |
| 5,086,900 A | * 2/1992 | Kikuta et al. | 74/89.38 |
| 5,095,766 A | 3/1992 | Knappe et al. | |
| 5,184,039 A | 2/1993 | Kraft | |
| 5,240,216 A | * 8/1993 | Lin et al. | 248/558 |
| 5,404,060 A | 4/1995 | Nakahashi et al. | |
| 5,410,229 A | 4/1995 | Sebastian et al. | |
| 5,449,043 A | 9/1995 | Bourner et al. | |
| 5,531,498 A | 7/1996 | Kowall | |
| 5,538,089 A | 7/1996 | Sanford | |
| 5,628,374 A | 5/1997 | Dibbern, Jr. | |
| 5,704,433 A | 1/1998 | Bourner et al. | |
| 5,738,177 A | 4/1998 | Schell et al. | |
| 5,787,644 A | 8/1998 | Thomsen, Jr. | |
| 6,026,611 A | 2/2000 | Ralston et al. | |
| 6,041,549 A | 3/2000 | Schust et al. | |
| 6,043,616 A | 3/2000 | Redelberger | |

(List continued on next page.)

FOREIGN PATENT DOCUMENTS

JP       58-131432 A   *  8/1983

*Primary Examiner*—Rodney H. Bonck
(74) *Attorney, Agent, or Firm*—Grossman, Tucker, Perreault & Pfleger, PLLC (57) ABSTRACT

An actuator including a plurality of mounts for facilitating connection of the actuator to a variety of mounting bracket configurations for securing the actuator within an assembly. Also provided is a clutch assembly including an input member, an output member and pawls. Torque is transferred through the clutch when applied to the input member in a clockwise or counter-clockwise direction. When torque is applied to the output member, the clutch permits rotation in only one direction of rotation.

21 Claims, 7 Drawing Sheets

U.S. PATENT DOCUMENTS 6,109,124 A * 8/2000 Chen .......................... 74/89.38
6,208,101 B1     3/2001 Seeberger et al.
6,288,464 B1 * 9/2001 Torii et al. ............... 192/223.2
6,338,404 B1 * 1/2002 Chen .......................... 192/223
6,390,264 B2 * 5/2002 Torii et al. ............... 192/223.2

* cited by examiner

ELECTRO-MECHANICAL ACTUATOR AND CLUTCH FOR THE SAME

FIELD OF THE INVENTION

The present invention relates generally to electro-mechanical actuators and to clutches, and, in one embodiment, to an improved actuator mechanism for operating an automobile door lock and an associated clutch.

BACKGROUND OF THE INVENTION

An electric door locking system for an automobile typically includes a separate actuator located, for example, in each door housing. Each actuator is provided with an appropriate interconnecting linkage for moving an internal door latch assembly between locked and unlocked positions. The actuators may be either solenoid devices, or may include appropriate gear trains driven by electric motors.

One problem encountered in incorporating an actuator in a door housing relates to the varying mounting configurations available for securing the actuator to the housing. Typically, each automobile manufacturer uses one or more specific mounting brackets for mounting the actuator within the door. As a result, the actuator for any given vehicle must be implemented with a specific mounting configuration adapted for the particular mounting bracket used for the vehicle.

Another problem associated with conventional actuator designs is that they cannot be configured in an efficient and reliable manner to prevent manual unlocking of the door which houses the actuator, which feature may be desirable to parents and others transporting children by automobile. Typical actuators also cannot be easily and efficiently configured to prevent a driver from being able to lock the driver's door manually, while still allowing manual unlocking, motor-driven unlocking, and motor-driven locking of the door, thereby reducing the possibility of a driver locking keys in the vehicle.

There is therefore a need in the art for an actuator that overcomes the aforesaid deficiencies of the prior art. There is a further need in the art for a clutch that restricts manual override of a system upon application of torque in one direction.

SUMMARY OF THE INVENTION

An actuator for controlling the lock state of an automobile door lock assembly consistent with one aspect of the invention may include a housing having a plurality of mounts. Each of a plurality of combinations of the mounts are adapted for receiving an associated one of a plurality of mounting elements for mounting the actuator adjacent the assembly.

A clutch consistent with the invention may include an output member having a plurality of output member arms and at least one pawl disposed between first and second ones of the output member arms. The first output member arm is configured to engage the pawl upon rotation of the output member in a first direction to allow rotation of the output member in the first direction. The second output member arm is configured to position the pawl against a fixed member to thereby resist rotation of the output member in a second direction. Consistent with the invention, the clutch may also be incorporated into an actuator for controlling the lock state of an automobile door lock assembly.

BRIEF DESCRIPTION OF THE DRAWING

For a better understanding of the present invention, together with other objects, features and advantages, reference should be made to the following detailed description which should be read in conjunction with the following figures wherein like numerals represent like parts.

DETAILED DESCRIPTION

Figure 1:
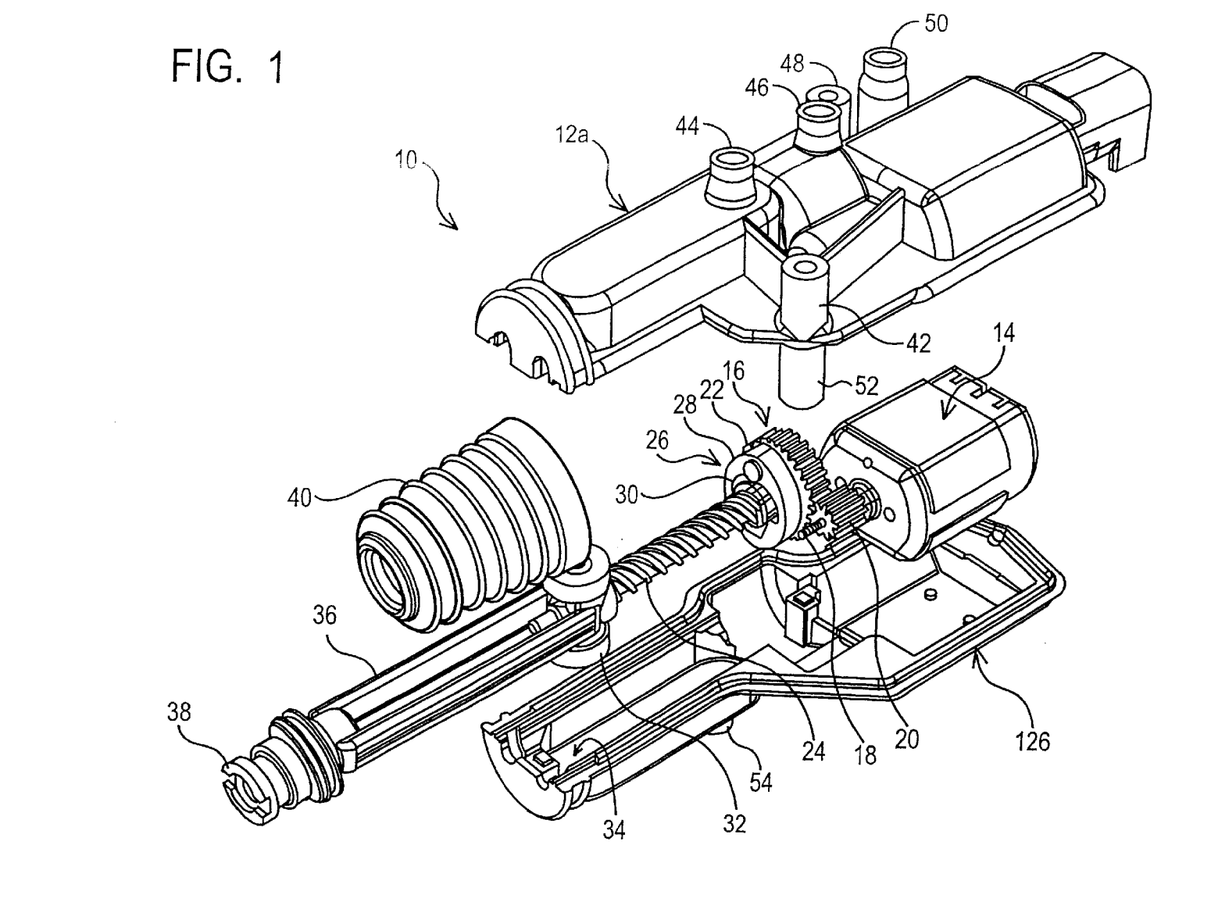
FIG. 1 is an exploded perspective view of an exemplary actuator consistent with the present invention.

With reference now to the drawings, FIG. 1 shows an exemplary embodiment of an actuator 10 consistent with the present invention. As shown, the actuator 10 includes upper housing 12a and lower housing 12b portions that mate to form a housing assembly 12. The housing assembly 12 houses a reversible electric motor 14, which has a gear train 16 coupled to its output shaft 18. In the illustrated exemplary embodiment, the gear train includes a spur gear 20 mounted on the output shaft 18 for driving a drive gear 22. The gear train drives a power transmitting device, e.g. a screw gear 24 in an exemplary embodiment, through a clutch 26, which includes a first member 28 and a second member 30. The drive gear 22 is coupled to the first member 28 of the clutch 26. The drive gear may be coupled to the first member 28 via a pin or rivet. The power transmitting device, e.g. the screw gear 24, is coupled to the second member 30 of the clutch.

The screw gear 24 has a nut 32 threaded thereon. The nut is disposed in a track 34 so as to reciprocate along a linear path depending on the direction of rotation of the screw gear 24. A drive arm 36 extends from the nut and outwardly from the housing assembly 12. The end 38 of the drive arm may be configured in many different configurations to connect to a movable device, whereby linear travel of the arm 36 may cause linear movement in the movable device. In one embodiment, the movable device may be an automobile door lock assembly, which is movable by the actuator between "locked" and "unlocked" conditions. In the illustrated exemplary embodiment, a protective boot 40 may also be provided. The boot prevents water, debris and other substances from entering housing assembly 12.

Figure 2:
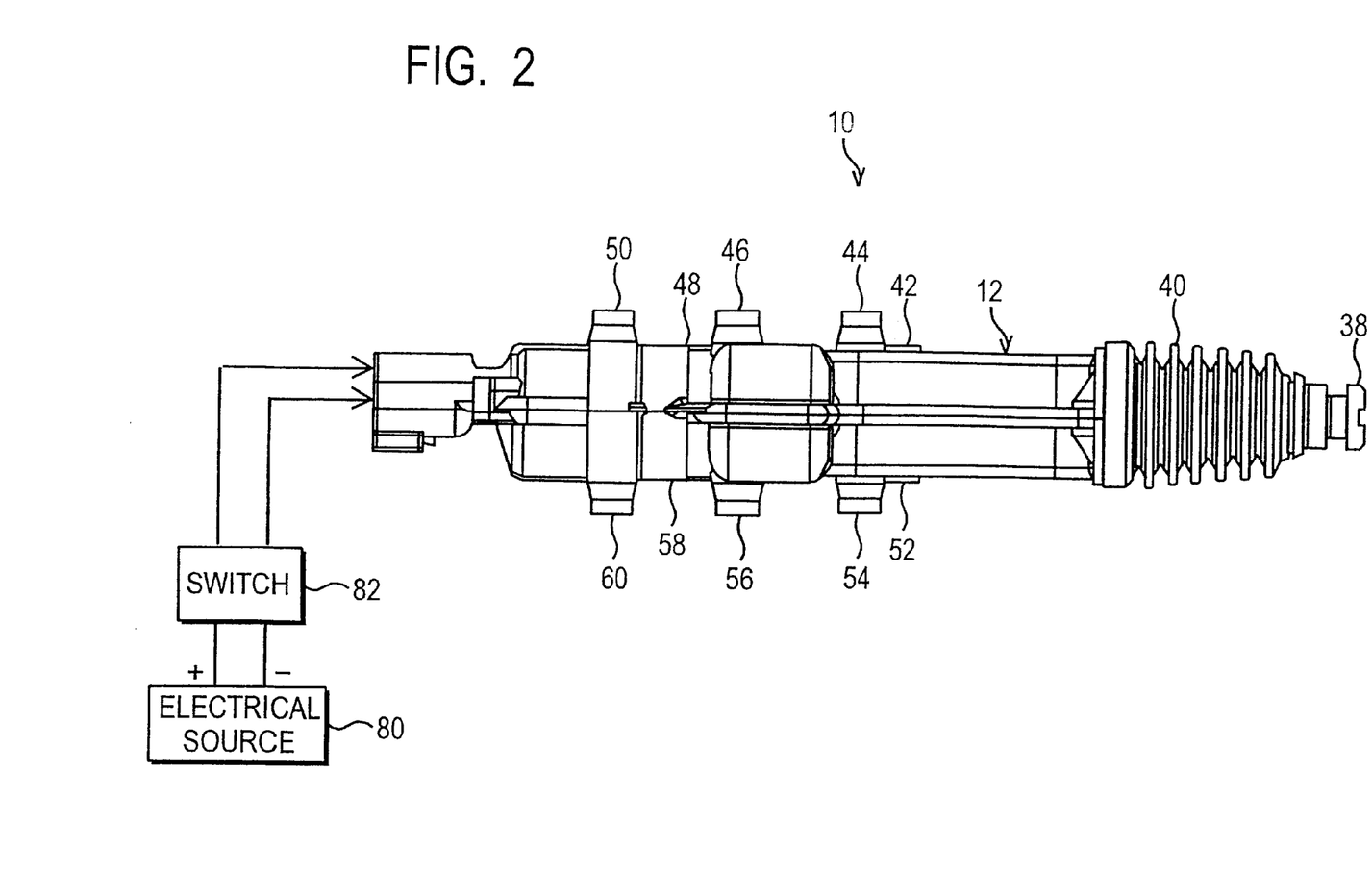
FIG. 2 is a side view of the actuator shown in FIG. 1.

With reference also to FIG. 2, extending from the upper 12a and lower 12b portions of housing 12 are a set of universal mounts 42–50 and 52–60. In the illustrated embodiment, mounts 42–50 are disposed on the upper housing portion 12a. Mounts 52, 54, 56, 58, and 60 are disposed on the bottom portion 12b of the housing opposite mounts 42, 44, 46, 48, and 50 respectively. Those skilled in the art will recognize that there are a number of mounting bracket configurations which may be used to mount an actuator inside an automobile door. Advantageously, the mounts on an actuator consistent with the present invention are positioned to facilitate mounting of the actuator via a plurality of different bracket configurations.

Figure 3:
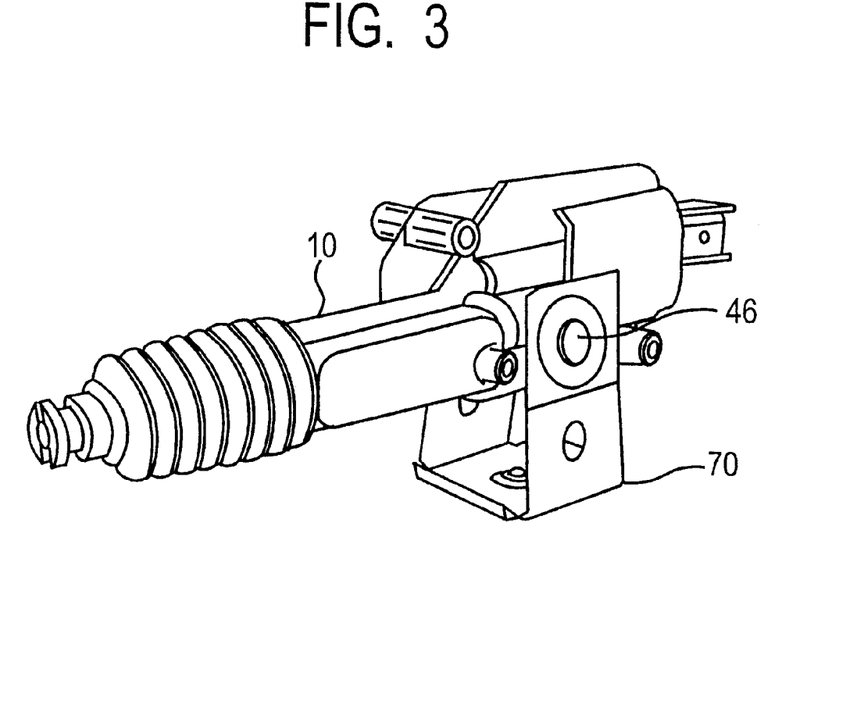
FIG. 3 is a perspective view of an actuator consistent with the invention secured to an exemplary mounting bracket.
Figure 4:
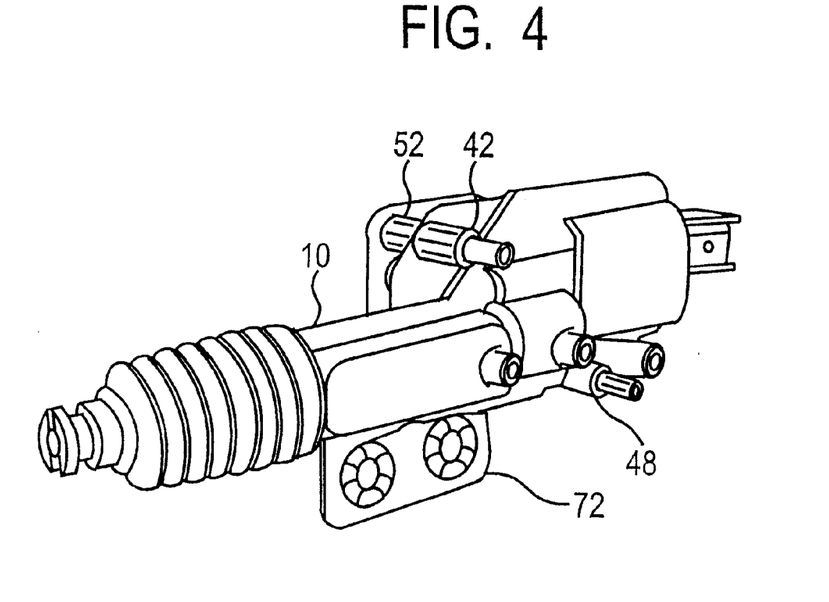
FIG. 4 is a perspective view the actuator illustrated in FIG. 3 secured to another exemplary mounting bracket.

FIG. 3, for example, illustrates an actuator 10 consistent with the invention that is pivotally secured to mounting element 70 via mounts 46 and 56. FIG. 4 illustrates the actuator 10 secured to a different mounting element 72, via mounts 42 and 52, and 48 and 58. Those skilled in the art will recognize that mounts 42–50 & 52–60 are capable of interacting with a wide variety of mounting elements, and that such elements are not limited to those depicted in FIGS. 3 and 4.

In operation, when the motor 14 is energized the arm 36 extends or retracts depending on the polarity and connection of the electrical source to the motor. With continued reference to FIG. 2, in an embodiment wherein the actuator is operatively connected to an automobile door lock assembly, the polarity and connection of an electrical source 80, e.g. the automobile battery, may be determined by a switch 82 provided, for example, in the automobile passenger compartment. By selective positioning of the switch 82, a user may energize the motor to place the door lock assembly in a "locked" or "unlocked" condition.

Advantageously, the clutch 26 may be configured as described in U.S. Pat. No. 4,819,493 (the '493 patent), the teachings of which are incorporated herein by reference. In an embodiment including a clutch 26 consistent with the '493 patent, the clutch allows transfer of torque from the motor output shaft 18 to the screw gear 24 when the motor is energized, but disconnects the output shaft 18 from the screw gear 24 when the motor is not operating. This enables operation such as manual locking or unlocking of the automobile door without rotation of the drive gear 22, spur gear 20 and the motor shaft 18".

An exemplary clutch configuration 26a consistent with the present invention is illustrated in FIGS. 5–9. In general, the clutch assembly 26a transfers torque from the motor shaft 18 to the screw gear 24 when the motor is energized to extend or retract the arm 36 for locking or unlocking the automobile door. However, in manual operation when the motor is not energized and input force is applied to the screw gear 24, the clutch 26 transfers the torque to the gear train 16 and motor shaft 18 in one direction of rotation, but prevents transfer of torque in anther direction. In this configuration, the automobile may be manually locked or unlocked, but not both.

Figure 5:
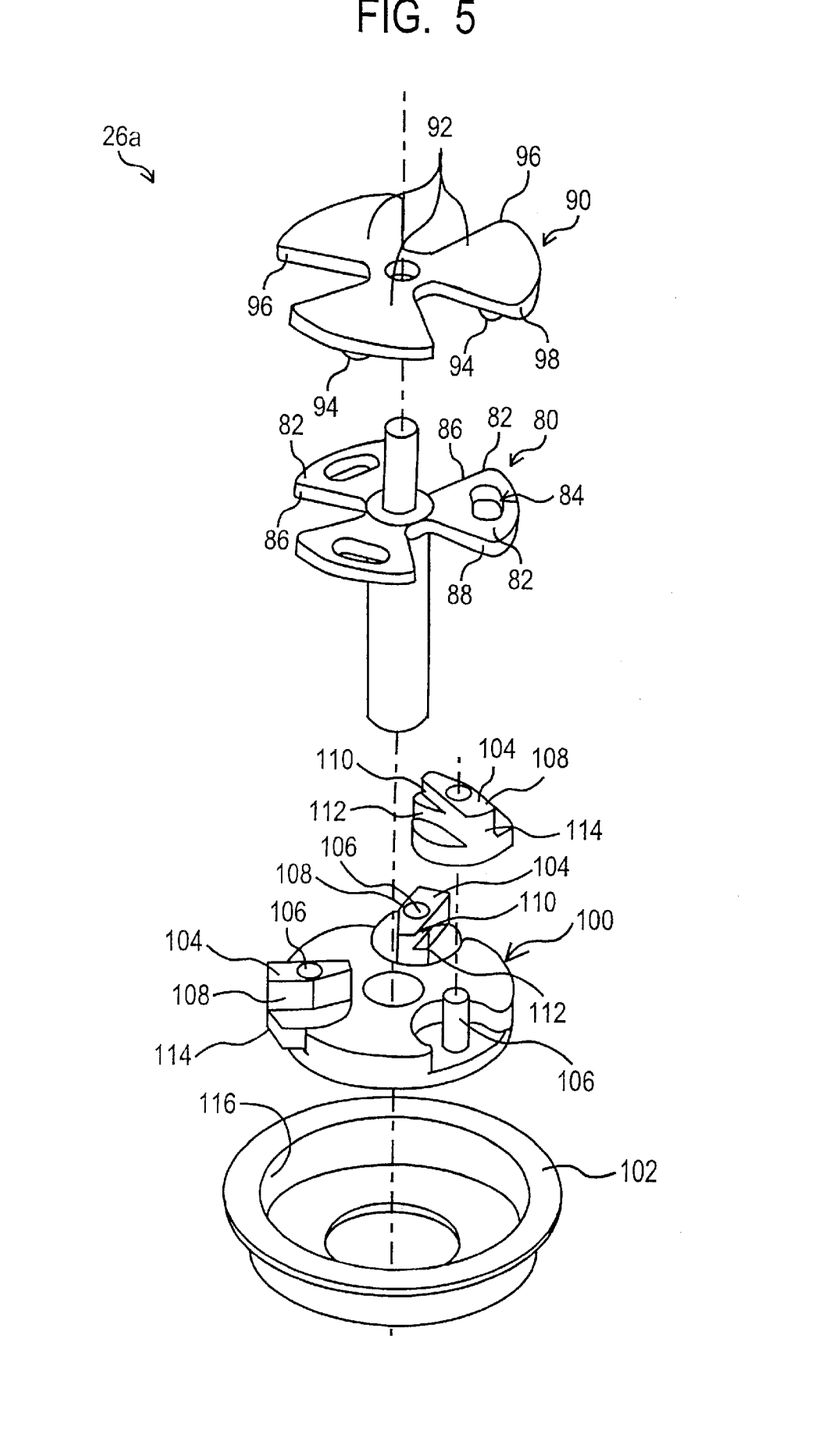
FIG. 5 is an exploded perspective view of an exemplary clutch consistent with the invention.

As shown in the exploded view of FIG. 5, a clutch consistent with the invention may include an output member 80 having a plurality of arms 82. Each arm may have an elongate aperture 84, a counter-clockwise pawl engagement surface 86, and a clockwise pawl engagement surface 88. The output member may be coupled directly to the screw gear 24 or other power-transmitting member.

An input member 90 is positioned generally concentrically with the output member 80. The input member includes a plurality of arms 92, each arm having a pin 94 extending from a surface thereof, a counter-clockwise pawl engagement surface 96 and a clockwise pawl engagement surface 98. Each pin 94 of the input member 90 extends into an associated aperture 84 of the output member 80. The input member 90 may be directly coupled to the gear train 16, e.g. to the face of drive gear 22.

A carrier 100 may be disposed generally concentrically with the output member 80, and may disposed within a fixed ring 102. Pawls 104 are pivotally disposed upon pins 106 of the carrier 100. Each pawl has a first engagement surface 108, a second engagement surface 110 on an opposite side of the pawl relative to the first engagement surface 108, and a third engagement surface 112 beneath the second engagement surface 110 and protruding outwardly from the pawl relative to the second engagement surface 110. In the illustrated exemplary embodiment, the perimeter surfaces 114 of the pawls are disposed in close proximity with the interior wall surface 116 of the carrier.

Turning now to FIGS. 6–9, operation of the clutch 26a will now be described in connection with the diagrammatic illustrations provided therein. For simplicity and ease of explanation, FIGS. 6–9 illustrate only one of the pawls 104. It is to be understood, however, that the remaining pawls function in an identical manner. Also, although the illustrated exemplary embodiment includes three pawls 84 that interact with three arms 82, 92 on the input and output members, those skilled in the art will recognize that a clutch consistent with the invention may be configured with any number of arms. For example, only two arms may be provided. It is to be understood that, as with all of the embodiments illustrated herein, the illustrated embodiment of the clutch 26a is provided only by way of illustration, not of limitation.

Figure 6:
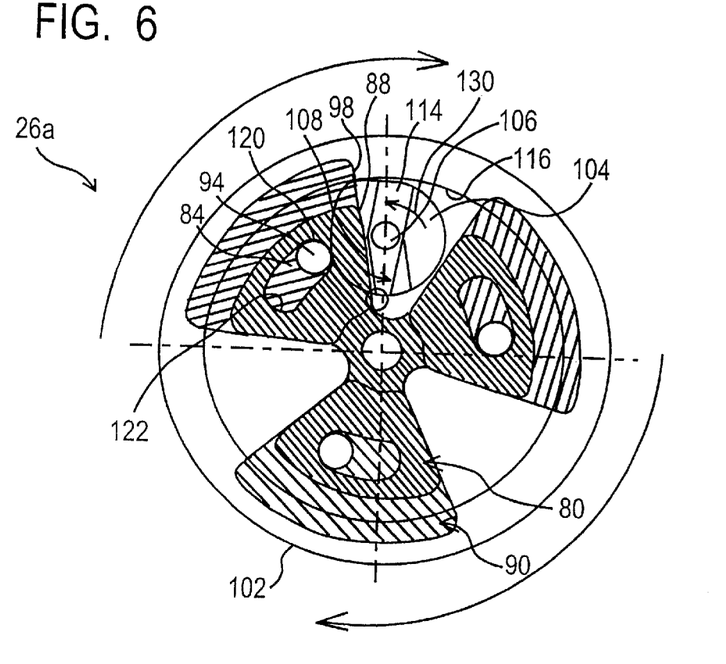
FIG. 6 illustrates operation of the clutch of FIG. 5 when input torque is applied to an input member of the clutch in a clockwise direction.
Figure 7:
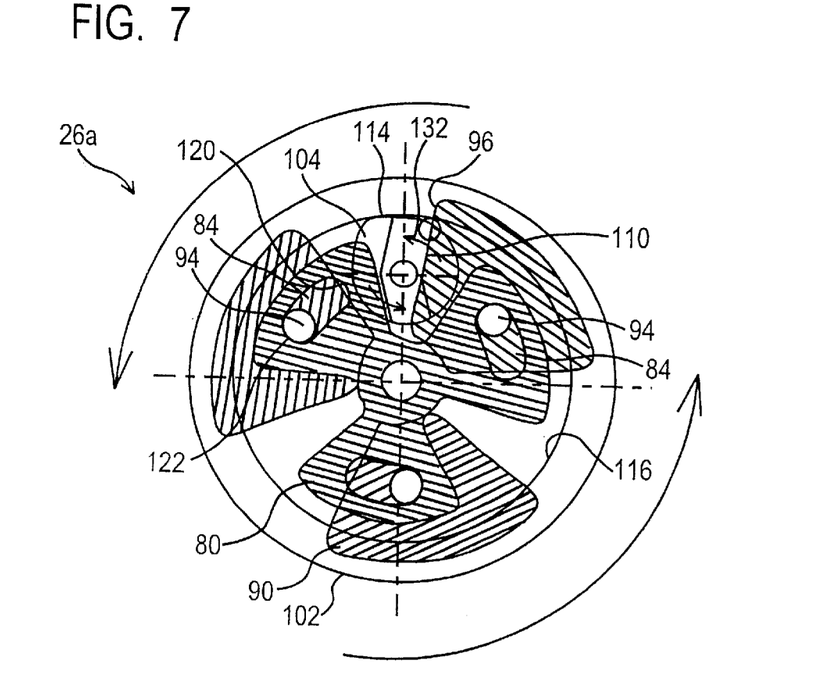
FIG. 7 illustrates operation of the clutch of FIG. 5 when input torque is applied to an input member of the clutch in a counter clockwise direction.

FIGS. 6 and 7 illustrate operation of the clutch 26a when input torque is applied by the motor to input member 90 through the gear train 16 in clockwise and counterclockwise directions, respectively. As shown in FIG. 6, when torque is applied by the motor 14 to the input member 90 in a clockwise direction, the pins 94 on the input member 90 engage a first end 120 of an aperture 84 on a corresponding arm 82 of the output member 80. The input 90 and output 80 members thus move in tandem, and the clockwise pawl engagement surfaces 88, 98 of the input and output members, respectively, engage the first engagement surface 108 of pawl 104. This rotates pawl 104 about the pin 106 in a counter-clockwise direction as indicated by arrows 130. Rotation of the pawl in a counter clockwise direction positions the perimeter surface 114 of the pawl so that it will not interfere with the interior surface 116 of the fixed ring 102 to allow rotation of the input 90 and output 80 members in a clockwise direction.

As shown in FIG. 7, when torque is applied by the motor 14 and gear train 16 to the input member 90 in a counterclockwise direction, the input member 90 rotates relative to the output member 80 until the pins 94 engage second ends 122 of their apertures 84. The input and output members may rotate in tandem until the counter-clockwise pawl engagement surface 96 of the output member 90 engages the second engagement surface 110 of the pawl 104, thereby rotating pawl 104 in a counter-clockwise direction as indicated by arrows 132. Rotation of the pawl in a counter clockwise direction positions the perimeter surface 114 of the pawl so that it will not interfere with the interior surface 116 of the fixed ring 102 to allow rotation of the input 90 and output 80 members in a counter-clockwise direction.

Figure 8:
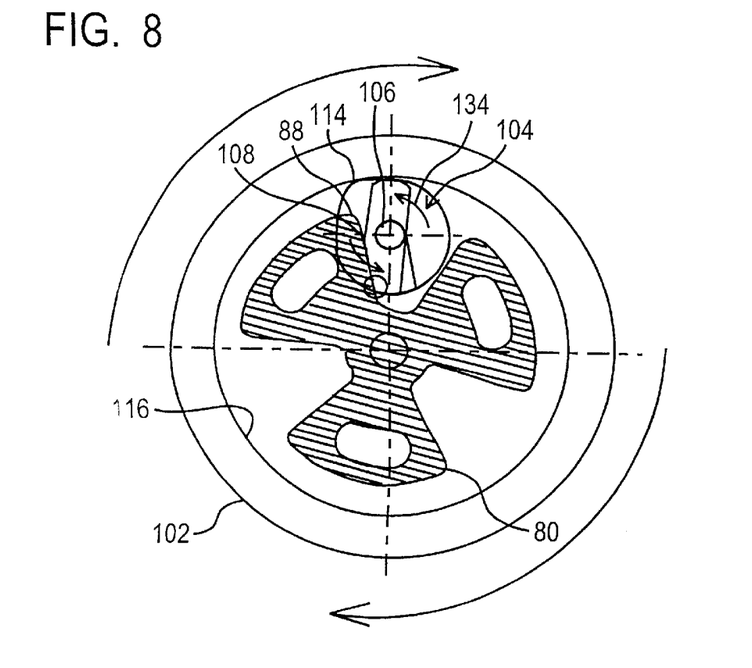
FIG. 8 illustrates operation of the clutch of FIG. 5 when input torque is applied to an output member of the clutch in a clockwise direction.
Figure 9:
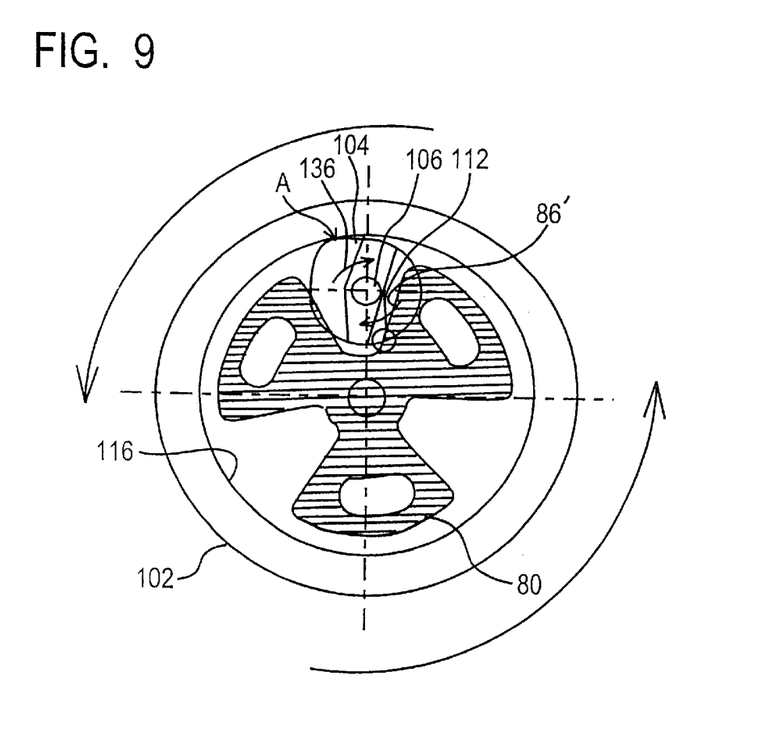
FIG. 9 illustrates operation of the clutch of FIG. 5 when input torque is applied to an output member of the clutch in a counter clockwise direction.

FIGS. 8 and 9 illustrate operation of the clutch 26a when input torque is applied through the screw gear 24, e.g. through the nut 32 and arm 36, to output member 80 in clockwise and counterclockwise directions, respectively. This mode of operation may occur, for example, in manual operation of a door lock assembly coupled to the arm 36. For ease of explanation, the input member 90 is not illustrated in FIGS. 8 and 9.

As shown in FIG. 8, when torque is applied to the output member 80 in a clockwise direction, the clockwise pawl engagement surface 88 of the input member 80 engages the first engagement surface 108 of pawl 104, thereby rotating pawl 104 in a counter-clockwise direction, as indicated by arrows 134. Rotation of the pawl in a counter-clockwise direction positions the perimeter surface 114 of the pawl so that it will not interfere with the interior surface 116 of the fixed ring 102 to allow rotation of the input 90 and output 80 members in a clockwise direction.

However, as shown in FIG. 9, when torque is applied to the output member 80 in a counter-clockwise direction, the counter-clockwise pawl engagement surface 86 of the input member 80 engages the third engagement surface 112 of pawl 104, thereby rotating pawl 104 in a clockwise direction, as indicated by arrows 136. Rotation of the pawl in a clockwise direction causes engagement of the perimeter surface 114 of the pawl with the interior surface 116, e.g. at region A, thereby binding the pawl against the fixed ring 102. In this position, rotation of the input and output members is substantially resisted.

Advantageously, therefore, a clutch 26a consistent with the invention restricts transfer of torque when torque is applied to the output member in one direction of rotation. This functionality may be suitable for use, for example, in the door of an automobile adjacent a child, to prevent the child from being able to unlock the door. In such an embodiment, the v ehicle operator can operate the electric motor to lock or unlock the door adjacent the child, but the child can only lock, not unlock, the door manually. This is typically referred to as "double locking."

Alternatively, the clutch can be configured to prevent only manual retraction of the arm, thereby preventing manual locking of the door while allowing manual unlocking, motor-driven unlocking, and motor-driven locking. In this embodiment, a driver is less likely to lock the keys inside the automobile, since the driver cannot lock the door manually but instead must operate the electric motor to lock the driver's side door. This operation can be accomplished from outside the automobile by, for example, using a remote control to operate the electric motor.

Figure 10:
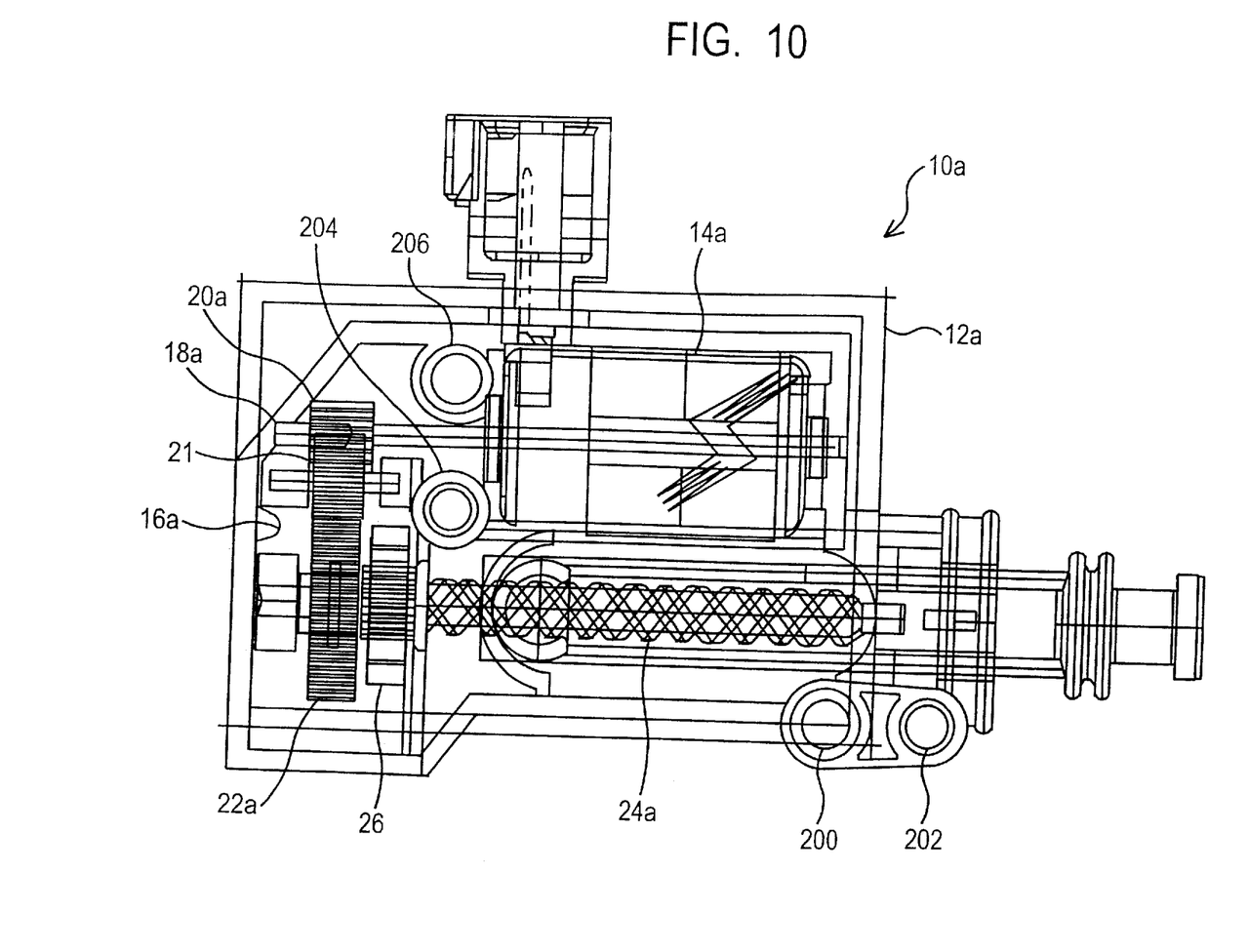
FIG. 10 illustrates another exemplary actuator consistent with the present invention.

Turning now to FIG. 10, there is illustrated another exemplary embodiment 10a of an actuator consistent with the invention. The actuator 10a is arranged with the reversible electric motor 14a disposed in a housing 12a in parallel relationship to a screw gear 24a. The housing 12a includes a set of universal mounts 200, 202, 204, 206, for mounting various mounting bracket configurations, as described above.

A gear train 16a is coupled to the output shaft 18a of the motor. In the illustrated exemplary embodiment, the gear train 16a includes a spur gear 20a mounted on the output shaft 18 for driving a drive gear 22a through an intermediate spur gear 21. The gear train drives a screw gear 24a through a clutch 26 (or 26a) as described above. Advantageously, due to the parallel relationship of the motor to the screw gear, the actuator 10a is more compact than the actuator 10 shown in FIG. 1

Thus, according to the present invention there is provided an actuator including a plurality of mounts for facilitating connection to a variety of mounting bracket configurations for securing the actuator within the door assembly. In addition, there is provided a clutch assembly including an input member, an output member and pawls. Torque is transferred through the clutch when applied to the input member in a clockwise or counter-clockwise direction. However, when torque is applied to the output member, the clutch permits rotation in only one direction of rotation.

Those skilled in the art will recognize that the actuator of the present invention, as well as the clutch, will have utility in contexts other than the actuation of an automobile door lock. The embodiments that have been described herein, therefore, are but some of the several which utilize this invention and are set forth here by way of illustration but not of limitation. It is obvious that many other embodiments, which will be readily apparent to those skilled in the art, may be made without departing materially from the spirit and scope of the invention.

What is claimed is:

1. A clutch comprising:
   an output member comprising a plurality of output member arms; and
   at least one pawl rotatably disposed on a carrier, said pawl disposed between first and second ones of said output member arms,
      said first output member arm being configured to engage said pawl upon rotation of said output member in a first direction to allow rotation of said output member in said first direction; and
      said second output member arm being configured to rotate said pawl to position said pawl against a fixed member to thereby resist rotation of said output member in a second direction.

2. A clutch according to claim 1, said clutch further comprising:
   an input member coupled to said output member for rotation with said output member, said input member comprising a plurality of input member arms, and said pawl being disposed between first and second ones of said input member arms,
      said first input member arm being configured to engage said pawl upon rotation of said input member in a first direction to allow rotation of said input member in said first direction,
      said second input member arm being configured to engage said pawl upon rotation of said input member in a second direction to allow rotation of said input member in said second direction.

3. A clutch according to claim 1, wherein said fixed member comprises a fixed ring and said carrier is disposed within said fixed ring.

4. A clutch comprising:
   an output member comprising a plurality of output member arms; and
   at least one pawl disposed between first and second ones of said output member arms,
      said first output member arm being configured to engage said pawl upon rotation of said output member in a first direction to allow rotation of said output member in said first direction;
      said second output member arm being configured to position said pawl against a fixed member to thereby resist rotation of said output member in a second direction;
   an input member coupled to said output member for rotation with said output member, said input member comprising a plurality of input member arms, and said pawl being disposed between first and second ones of said input member arms,
      said first input member arm being configured to engage said pawl upon rotation of said input member in a first direction to allow rotation of said input member in said first direction,
      said second input member arm being configured to engage said pawl upon rotation of said input member in a second direction to allow rotation of said input member in said second direction;
wherein said pawl includes first, second, and third engagement surfaces,
said first input member arm being configured to engage said first engagement surface upon rotation of said input member in said first direction,
said second input member arm being configured to engage said second engagement surface upon rotation of said input member in said second direction,
said first output member arm being configured to engage said first engagement surface upon rotation of said output member in said first direction, and
said second output member arm being configured to engage said third engagement surface to position said pawl against said fixed member.

5. A clutch comprising:
an output member comprising a plurality of output member arms; and
at least one pawl disposed between first and second ones of said output member arms,
said first output member arm being configured to engage said pawl upon rotation of said output member in a first direction to allow rotation of said output member in said first direction;
said second output member arm being configured to position said pawl against a fixed member to thereby resist rotation of said output member in a second direction;
an input member coupled to said output member for rotation with said output member, said input member comprising a plurality of input member arms, and said pawl being disposed between first and second ones of said input member arms,
said first input member arm being configured to engage said pawl upon rotation of said input member in a first direction to allow rotation of said input member in said first direction,
said second input member arm being configured to engage said pawl upon rotation of said input member in a second direction to allow rotation of said input member in said second direction; and
wherein said input member is coupled to said output member by at least one pin.

6. A clutch according to claim 5, wherein said at least one pin extends from said input member into an aperture defined in an associated one of said output member arms.

7. A clutch according to claim 6, wherein said input member is configured to rotate relative to said output member with said pin traveling in said aperture.

8. A clutch comprising:
an output member comprising first, second and third output member arms;
a first pawl disposed between said first and second output member arms;
a second pawl disposed between said second and third output member arms; and
a third pawl disposed between said first and third output member arms, wherein said first second and third pawls are rotatably disposed on a carrier, said first, second and third output member arms being configured to engage said first, second, and third pawls, respectively, upon rotation of said output member in a first direction to allow rotation of said output member in said first direction; and
said first, second and third output member arms being configured to rotate said third, first, and third pawls to position said third, first, and second pawls, respectively, against a fixed member to thereby resist rotation of said output member in a second direction.

9. A clutch according to claim 8, said clutch further comprising:
an input member coupled to said output member for rotation with said output member, said input member comprising first, second, and third input member arms, said first pawl being disposed between said first and second input member arms, said second pawl being disposed between said second and third input member arms, and said third pawl being disposed between said first and third input member arms,
said first, second and third input member arms being configured to engage said first, second, and third pawls, respectively, upon rotation of said input member in a first direction to allow rotation of said input member in said first direction; and
said first, second and third input member arms being configured to engage said third, first, and second pawls, respectively, upon rotation of said input member in a second direction to allow rotation of said input member in said second direction.

10. A clutch according to claim 8, wherein said fixed member comprises a fixed ring and said carrier is disposed within said fixed ring.

11. A clutch comprising:
an output member comprising first, second and third output member arms;
a first pawl disposed between said first and second output member arms;
a second pawl disposed between said second and third output member arms; and
a third pawl disposed between said first and third output member arms,
said first, second and third output member arms being configured to engage said first, second, and third pawls, respectively, upon rotation of said output member in a first direction to allow rotation of said output member in said first direction; and
said first, second and third output member arms being configured to position said third, first, and second pawls, respectively, against a fixed member to thereby resist rotation of said output member in a second direction; and
an input member coupled to said output member for rotation with said output member, said input member comprising first, second, and third input member arms, said first pawl being disposed between said first and second input member arms, said second pawl being disposed between said second and third input member arms, and said third pawl being disposed between said first and third input member arms,
said first, second and third input member arms being configured to engage said first, second, and third pawls, respectively, upon rotation of said input member in a first direction to allow rotation of said input member in said first direction; and
said first, second and third input member arms being configured to engage said third, first, and second pawls, respectively, upon rotation of said input member in a second direction to allow rotation of said input member in said second direction; and
wherein said input member is coupled to said output member by at least one pin.

12. A clutch according to claim 11, wherein said input member includes first, second, and third pins extending therefrom, said first, second, and third pins extending into an associated aperture in said first, second, and third output member arms, respectively.

13. A clutch according to claim 12, wherein said input member is configured to rotate relative to said output member with each said pin traveling in said associated aperture.

14. An actuator for controlling the lock state of an automobile door lock assembly, said actuator comprising:
a housing;
a reversible electric motor disposed within said housing and having an output shaft;
a gear train coupled to said output shaft; and
a power transmitting device coupled to a drive gear of said gear train through a clutch,
   said clutch comprising an input member coupled to said drive gear, an output member coupled to said power transmitting device, said output member comprising a plurality of output member arms, and at least one pawl rotatably disposed on a carrier, said pawl disposed between first and second ones of said output member arms,
   said first output member arm being configured to engage said pawl upon rotation of said output member in a first direction to allow rotation of said output member in said first direction; and
   said second output member arm being configured to rotate said pawl to position said pawl against a fixed member to thereby resist rotation of said output member in a second direction.

15. An actuator according to claim 14, wherein said input member comprises a plurality of input member arms, said pawl being disposed between first and second ones of said input member arms,
   said first input member arm being configured to engage said pawl upon rotation of said input member in said first direction to allow rotation of said input member in said first direction,
   said second input member arm being configured to engage said pawl upon rotation of said input member in a second direction to allow rotation of said input member in said second direction.

16. An actuator according to claim 14, wherein said fixed member comprises a fixed ring and said carrier is disposed within said fixed ring.

17. An actuator according to claim 14, wherein said housing comprises a plurality of mounts; each of a plurality of combinations of said mounts being adapted for receiving an associated one of a plurality of mounting elements for mounting said actuator adjacent said assembly.

18. An actuator for controlling the lock state of an automobile door lock assembly, said actuator comprising:
a housing;
a reversible electric motor disposed within said housing and having an output shaft;
a gear train coupled to said output shaft; and
a power transmitting device coupled to a drive gear of said gear train through a clutch,
   said clutch comprising an input member coupled to said drive gear, an output member coupled to said power transmitting device, said output member comprising a plurality of output member arms, and at least one pawl disposed between first and second ones of said output member arms,
   said first output member arm being configured to engage said pawl upon rotation of said output member in a first direction to allow rotation of said output member in said first direction; and
   said second output member arm being configured to position said pawl against a fixed member to thereby resist rotation of said output member in a second direction; and
wherein said input member comprises a plurality of input member arms, said pawl being disposed between first and second ones of said input member arms,
   said first input member arm being configured to engage said pawl upon rotation of said input member in a first direction to allow rotation of said input member in said first direction,
   said second input member arm being configured to engage said pawl upon rotation of said input member in a second direction to allow rotation of said input member in said second direction; and
wherein said pawl includes first, second, and third engagement surfaces,
   said first input member arm being configured to engage said first engagement surface upon rotation of said input member in said first direction,
   said second input member arm being configured to engage said second engagement surface upon rotation of said input member in said second direction,
   said first output member arm being configured to engage said first engagement surface upon rotation of said output member in said first direction, and
   said second output member arm being configured to engage said third engagement surface to position said pawl against said fixed member.

19. An actuator for controlling the lock state of an automobile door lock assembly, said actuator comprising:
a housing;
a reversible electric motor disposed within said housing and having an output shaft;
a gear train coupled to said output shaft; and
a power transmitting device coupled to a drive gear of said gear train through a clutch,
   said clutch comprising an input member coupled to said drive gear, an output member coupled to said power transmitting device, said output member comprising a plurality of output member arms, and at least one pawl disposed between first and second ones of said output member arms,
   said first output member arm being configured to engage said pawl upon rotation of said output member in a first direction to allow rotation of said output member in said first direction; and
   said second output member arm being configured to position said pawl against a fixed member to thereby resist rotation of said output member in a second direction; and wherein said input member comprises a plurality of input member arms, said pawl being disposed between first and second ones of said input member arms, said first input member arm being configured to engage said pawl upon rotation of said input member in a first direction to allow rotation of said input member in said first direction, said second input member arm being configured to engage said pawl upon rotation of said input member in a second direction to allow rotation of said input member in said second direction; and wherein said input member is coupled to said output member by at least one pin.

20. An actuator according to claim 19, wherein said at least one pin extends from said input member into an aperture defined in an associated one of said output member arms.

21. An actuator according to claim 20, wherein said input member is configured to rotate relative to said output member with said pin traveling in said aperture.

* * * * *

UNITED STATES PATENT AND TRADEMARK OFFICE
CERTIFICATE OF CORRECTION

PATENT NO.    : 6,557,688 B2
DATED         : May 6, 2003
INVENTOR(S)   : Henry Minasian, Brian Ganter and Bill Farmer It is certified that error appears in the above-identified patent and that said Letters Patent is hereby corrected as shown below:

<u>Title page,</u>
Item [73], Assignee, please replace "Canton, MI" with -- Canton, MA --.

Signed and Sealed this

Twenty-sixth Day of August, 2003

JAMES E. ROGAN
*Director of the United States Patent and Trademark Office*